UNITED STATES PATENT OFFICE.

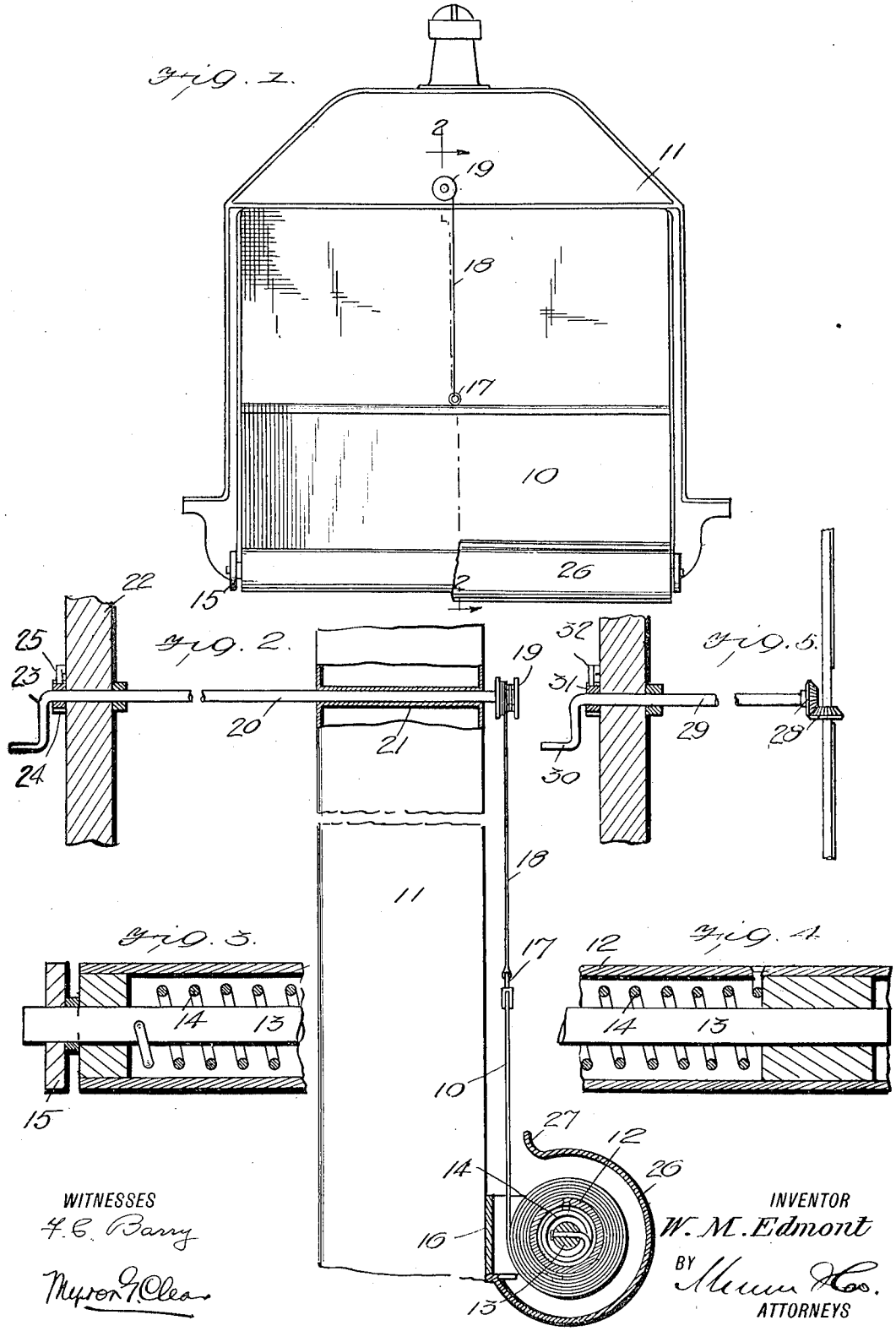

WILLIAM M. EDMONT, OF DULUTH, MINNESOTA.

RADIATOR-COVER AND TEMPERATURE-REGULATOR.

1,291,807.  Specification of Letters Patent.  Patented Jan. 21, 1919.

Application filed January 30, 1918. Serial No. 214,475.

*To all whom it may concern:*

Be it known that I, WILLIAM M. EDMONT, a citizen of the United States, and a resident of Duluth, in the county of St. Louis and State of Minnesota, have made certain new and useful Improvements in Radiator-Covers and Temperature - Regulators, of which the following is a specification.

My present invention relates particularly to a cover for radiators of automobiles and other machines embodying engine cooling systems utilizing radiators, my object being to provide a simple and inexpensive means whereby a cover normally in inactive position and substantially concealed from view, may be adjusted to more or less completely cover the radiator opening, as desired, in order to permit of ingress of air when, and when only such air is needful.

In the accompanying drawing illustrating my invention forming a part of this specifition :—

Figure 1 is a front elevation illustrating the practical application of my invention;

Fig. 2 is a side view partly in elevation and partly in section and more or less diagrammatic showing my improvements;

Figs. 3 and 4 are sectional views through opposite ends of the spring roller, and, Fig. 5 is a partial sectional view illustrating a slightly modified form.

Referring now to these figures, my invention proposes the utilization of a radiator cover in the form of a flexible member 10, which is movable more or less across the front face of a radiator such as seen at 11 in Figs. 1 and 2, and is for this purpose wound at one edge upon a spring roller 12, rotatable upon its shaft 13 to which it is connected by an internal spring 14, the ends of the shaft 13, being secured through the forwardly turned end ears 15 of a bracket 16 secured transversely of the radiator 11 across the lower portion thereof.

The upper edge of the cover or curtain 10 has a central eye 17, which, as seen in Figs. 1 and 2, receives one end of a flexible controlling connection 18, the opposite end of which is wound upon a roller 19 secured upon the forward end of an upper shaft 20, the latter being journaled through a bearing 21 of the radiator 11, and in practice extending rearwardly through, for instance, the dash 22 of a motor vehicle with its rear end provided with a hand crank 23. The rear end of the shaft 20 is also preferably provided with a toothed wheel 24 engageable by means of a pawl 25 or the like, whereby upon rotation of shaft 20 to draw the curtain 10 upwardly, and more or less cover the front face of the radiator against the tension of the roller spring 14, the said curtain may be locked in adjustably elevated position, it being obvious that otherwise, as well as when pawl 25 is released, spring 14 will rotate the roller 12 to rewind the entire cover or curtain 10 thereon.

In use, the bracket 16 supporting the spring roller is preferably provided with a shield 26 extending forwardly from its lower portion and curved upwardly around the roller 14 with the curtain 10 thereon, the free edge 27 of the shield being curved upwardly at a point above the roller 12 and spaced sufficiently from the forward or outer face of the radiator 10 to permit of free upward and downward movement of the cover or curtain 10 as previously described.

It is obvious from the foregoing that instead of being disposed transversely of the lower portion of the radiator, the curtain might be mounted at one side, although it is equally obvious that as so mounted it is hardly as susceptible of practically complete concealment under ordinary conditions, as by means of the positioning first above described.

It is also obvious that various means may be employed for adjustably elevating the curtain and maintaining the same in adjusted position, as for instance by means of gears 28 in mesh with one another, one of which is upon the forward end of a controlling shaft 29, otherwise similar to previously described shaft 20, and having a hand crank 30, toothed wheel 31, and pawl 32, as seen in Fig. 5.

I may also utilize the curtain or cover at the inner side of the radiator, and it may be adjusted by means of a flexible connection over a pulley as well as by the gears and connections before described.

I claim :—

The combination with an engine cooling radiator, of a one-piece bracket secured to the outer face of said radiator transversely across its lower portion and having forwardly turned ears at its ends, a spring roller extending forwardly of and along said bracket and having a shaft, the ends of which shaft are supported by said bracket ears, a flexible cover or curtain mounted on said roller, and means for adjusting said curtain vertically along the front face of the radiator, said bracket having a shield curved forwardly and upwardly from its lower edge around the roller and its curtain, the free edge of which shield is curved upwardly in spaced relation to the lower portion of the radiator to provide for the passage of the curtain.

WILLIAM M. EDMONT.

Witnesses:
 NELLIE BROPHY,
 E. J. EDMONT.